United States Patent [19]

Kuijk

[11] Patent Number: 4,892,389

[45] Date of Patent: Jan. 9, 1990

[54] METHOD OF DRIVING A DISPLAY DEVICE AND A DISPLAY DEVICE SUITABLE FOR SUCH A METHOD

[75] Inventor: Karel E. Kuijk, Eindhoven, Netherlands

[73] Assignee: U.S. Philips Corporation, New York, N.Y.

[21] Appl. No.: 106,084

[22] Filed: Oct. 7, 1987

[30] Foreign Application Priority Data

Oct. 28, 1986 [NL] Netherlands .......................... 8602698

[51] Int. Cl.⁴ .......................... G02F 1/133; G09G 3/36

[52] U.S. Cl. .......................................... 350/333; 340/784

[58] Field of Search ............................ 350/339 R, 333

[56] References Cited

U.S. PATENT DOCUMENTS

| | | | |
|---|---|---|---|
| 4,223,308 | 9/1980 | Baraff et al. | 350/334 |
| 4,367,924 | 1/1983 | Clark et al. | 350/350 S |
| 4,508,429 | 4/1984 | Nagae et al. | 350/350 S |
| 4,753,518 | 6/1988 | Clerc | 350/333 |

OTHER PUBLICATIONS

Castleberry, Donald E. "Varistor Controlled Multiplexed Liquid Crystal Display," *Biennial Display Research Conference* (Oct. 1978), pp. 42–43.

Lechner et al., "Liquid Crystal Matrix Displays," *Proceedings of the IEEE*, vol. 59, No. 11, (Nov. 1971), pp. 1566–1579.

*Primary Examiner*—Andrew J. James

*Assistant Examiner*—Anita Pellman Gross

*Attorney, Agent, or Firm*—John C. Fox

[57] ABSTRACT

The number of grey levels in LCD display devices is substantially increased by selecting the picture elements during a short part of the line period. The column electrode is subsequently fixed at a reference voltage. The capacitive croostalk thereby considerably decreases, enabling the use of crosstalk compensation for introducing even more grey levels and/or the adoption of redundancy measures which would otherwise be impossible dure to loss of grey levels.

18 Claims, 3 Drawing Sheets

METHOD OF DRIVING A DISPLAY DEVICE AND A DISPLAY DEVICE SUITABLE FOR SUCH A METHOD

BACKGROUND OF THE INVENTION

The invention relates to a method of driving a display device comprising an electro-optical display medium between two supporting plates, a system of picture elements arranged in rows and columns with each picture element being constituted by picture electrodes provided on the facing surfaces of the supporting plates, and a system of row and column electrodes, the method including selecting a row of picture elements via the row electrodes by means of non-linear switching elements arranged in series with the picture elements, and presenting a data signal via the column electrodes.

The invention also relates to a display device in which such a method can be used.

In this respect it is to be noted that the terms "row electrode" and "column electrode" in this Application may be interchanged if desired, so that references to a column electrode and a row electrode may be taken to mean a row electrode, and a column electrode respectively.

A display device of this type is suitable for displaying alpha-numeric and video information with the aid of passive electro-optical display media such as liquid crystals, electrophoretic suspensions and electrochromic materials.

A display device as mentioned above in which back-to-back diodes are used as switching elements is known from U.S. Pat. No. 4,223,308. A memory function is obtained by using switching elements so that the information presented to a driven row remains present to a sufficient extent across a picture element during the time when the other row electrodes are driven. However, due to capacitive crosstalk owing to the capacitance of the non-linear switching elements this information may have a varying value because the same columns are used for presenting data signals upon selection of different rows of picture elements.

The voltage across a picture element may then change in such a manner that the transmission level (grey level) becomes higher or lower than the intended value. If the grey levels are to be fixed exclusively via the transmission curve, the number of grey levels is limited to a large extent by the crosstalk in relation to the maximum signal level.

The crosstalk due to signal changes is dependent in the first instance on the capacitance of the non-linear switching elements.

Another possibility of realizing grey levels is to divide a picture element into a number of sub-segments in which the fraction of the number of selected sub-segments determines the grey level. This requires an extra drive with extra column electrodes.

Such a division without extra drive may also be used for the purpose of providing a given redundancy because connections may drop out. This division usually leads to smaller sub-elements for which smaller picture electrodes are used. However, this results in the capacitance of the picture elements decreasing (relatively) with respect to that of the non-linear switching elements. Consequently the crosstalk increases.

SUMMARY OF THE INVENTION

The present invention has for its object to provide a method of the type described in the opening paragraph in which the above-mentioned drawbacks are substantially obviated.

To this end a method according to the invention is characterized in that a data signal or a part of a data signal is presented to a column electrode during a part of the period which is available for selection of a row of picture elements, which data signal is presented substantially simultaneously with a selection signal presented to the row electrode associated with the row of picture elements, in that a non-selection signal is presented to the row electrode during the other part of the period available for selection and in that a reference voltage is presented to the column electrode in the absence of a data signal.

In television applications the reference voltage is preferably determined by the mean value of the minimum data signal voltage in a first frame and the maximum data signal voltage in a second frame.

A value of 0 volt is preferably chosen for the reference voltage.

The non-prepublished Netherlands Patent Application No. 861804, corresponding to U.S. patent application Ser. No. 277,403, filed Nov. 28, 1988, in the name of the Applicant, proposes a method in which a data signal, after selection of a row and before selection of a subsequent row, changes its sign with respect to a reference voltage determined by the mean value of the minimum data signal voltage in a first (odd) frame and the maximum data signal voltage in a second (even) frame and in which the energy content of the sub-signal having a positive sign with respect to the reference voltage is substantially identical to that of the sub-signal having a negative sign with respect to the reference voltage.

As it were, the crosstalk is compensated by generating a crosstalk signal of opposite sign and with a substantially identical energy content.

In an embodiment described in this Netherlands Patent Application, the data signal consists of 2 sub-signals having substantially identical absolute voltage values and a duration of substantially half the line period. The signals of opposite sign can be obtained with simple inverter circuits.

Notably, when rapid non-linear switching elements such as, for example, diode rings, are used switching can be effected very rapidly.

The present invention is based on the the recognition that when using rapid switching elements the crosstalk can be still further reduced by presenting the data signal during a period which is short with respect to the maximum available period for selection. As the presentation of the data signal is effected for a shorter period, the crosstalk decreases; it may then decrease to such an extent that the division of the data signal into sub-signals of opposite sign is not necessary. Nevertheless the advantages of such a division into sub-signals of course remain.

A particular method according to the invention is characterized in that, for presenting the reference voltage to the column electrode, the data signal changes its sign with respect to the reference voltage and the energy content of the sub-signal thus obtained having a positive sign with respect to the reference voltage is substantially identical to that of the sub-signal having a negative sign with respect to the reference voltage, while one of the sub-signals substantially coincides with the selection signal.

The rapid switching times render the method attractive for use in colour television having a double number of lines (high-definition television or HD TV).

Since the crosstalk has now become substantially negligible, the picture elements can be split up into a plurality of sub-elements for the purpose of redundancy. A device for use in a method according to the invention, comprising an electro-optical display medium between two supporting plates, a system of picture elements arranged in rows and columns with each picture element being constituted by picture electrodes provided on the facing surfaces of the supporting plates and a system of row and column electrodes for driving the picture electrodes via non-linear switching elements is therefore characterized in that a picture electrode is split up into a plurality of sub-electrodes which are each driven via at least one non-linear switching element.

A further display device of the type described is characterized in that a column electrode is connected to a terminal for a signal to be displayed and to a terminal for a reference voltage, respectively, via a parallel arrangement of two branches having complementarily operating switches.

In a display device in which the crosstalk compensation is used, the branch for the signal to be displayed comprises two sub-branches having switches, while one of the sub-branches comprises an inverter circuit in series with the switch.

Complementarily operating switches are to be understood to mean that one switch is open while the other switch is closed and vice versa.

The display device also preferably comprises a drive circuit for the (complementary)switches.

BRIEF DESCRIPTION OF THE DRAWING

The invention will now be described in greater detail with reference to some embodiments and the accompanying drawings in which.

DESCRIPTION OF THE PREFERRED EMBODIMENT

Figure 1:
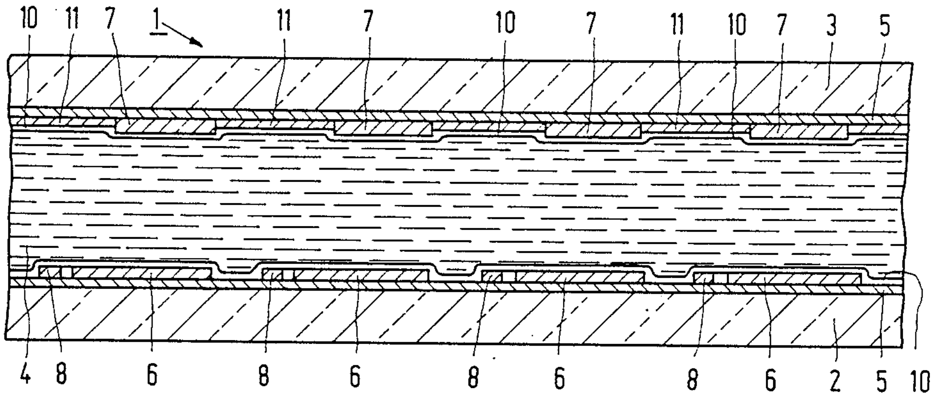
FIG. 1 is a diagrammatic cross-sectional view of part of a display device in which the invention is used, FIG. 2 diagrammatically shows a transmission voltage characteristic curve of a display cell in such a display device, FIG. 3 diagrammatically shows part of a drive circuit for such a display device, FIG. 4 diagrammatically shows a substitution diagram of an element of such a display device.

FIG. 1 is a diagrammatic cross-sectional view of part of a display device 1 which is provided with two supporting plates 2 and 3 between which a liquid crystal 4 is present. The inner surfaces of the supporting plates 2 and 3 are provided with electrically and chemically insulating layers 5. A larger number of picture electrodes 6 and 7 arranged in rows and columns are provided on the supporting plates 2 and 3, respectively. The facing picture electrodes 6 and 7 constitute the picture elements of the display device. Strip-shaped column electrodes 11 are provided between the columns of picture electrodes 7. Advantageously, the column electrodes 11 and the picture electrodes 7 can be integrated to form strip-shaped electrodes. Strip-shaped row electrodes 8 are provided between the rows of picture electrodes 6. Each picture electrode 6 is connected, for example, to a row electrode 8 by means of a diode 9 not shown in FIG. 1. The diodes 9 provide the liquid crystal 4 by means of voltages at the row electrodes 8 with a sufficient threshold with respect to the voltage applied to the column electrodes 11 and provide the liquid crystal picture elements with a memory. Furthermore liquid crystal orientation layers 10 are provided on the inner surfaces of the supporting plates 2 and 3. As is known a different orientation state of the liquid crystal molecules and hence an optically different state can be obtained by applying a voltage across the liquid crystal layer 4. The display device can be realized both as a transmissive and as a reflective device.

Figure 2:
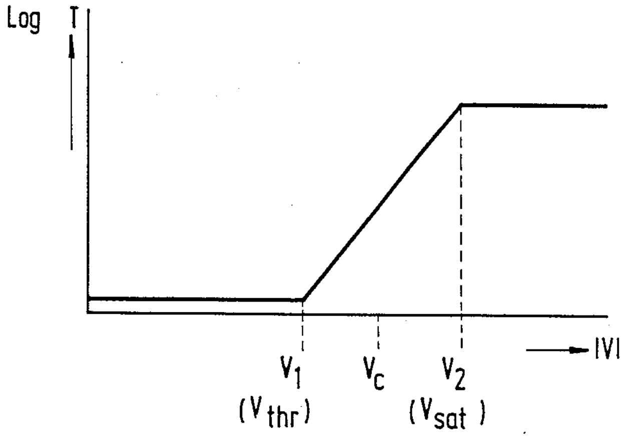

FIG. 2 diagrammatically shows a transmission/voltage characteristic curve of a display cell as occurs in the display device of FIG. 1. Below a given threshold ($V_1$ or $V_{thr}$) the cell transmits substantially no light, whereas above a given saturation voltage ($V_2$ or $V_{sat}$) the cell is substantially completely light-transmissive.

Figure 3:
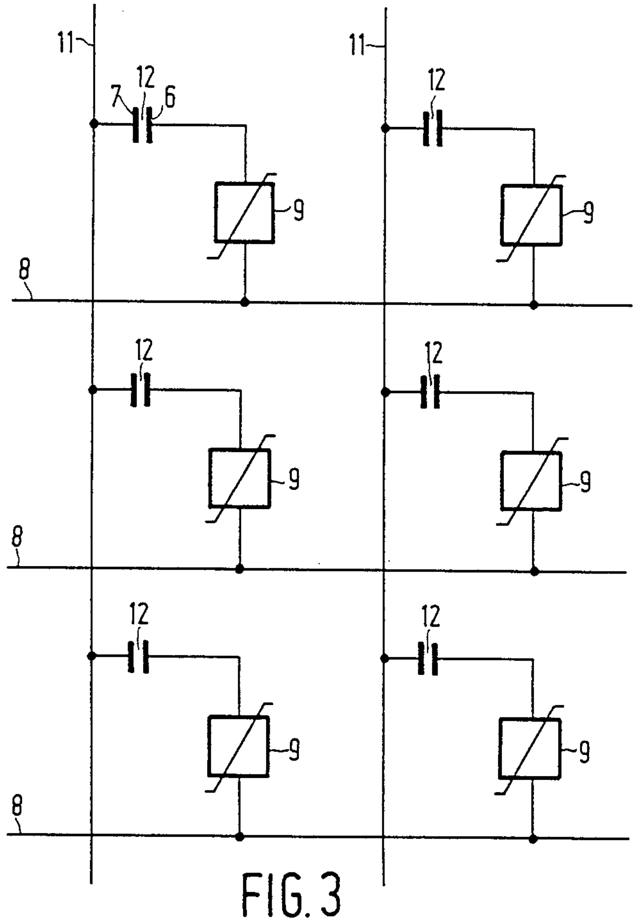

FIG. 3 diagrammatically shows a part of such a display device. The picture elements 12 are connected via the picture electrodes 7 to column electrodes 11 which together with the row electrodes 8 in this embodiment are arranged in the form of a matrix. The picture elements 12 are connected through the picture electrodes 6 to the row electrodes 8 via non-linear switching elements 9.

Figure 4:
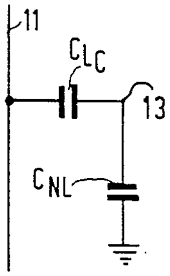

FIG. 4 shows a substitution diagram for a picture element 12 represented by the capacitance $C_{LC}$ associated therewith and the capacitance of the associated non-linear switching element (in the high-ohmic state) $C_{NL}$ for calculating the crosstalk due to signal variations at a column electrode 11. The non-linear element which is connected to a fixed voltage is considered to be connected to ground for the description below (while using the superposition principle). This non-linear element is not necessarily a (back-to-back) diode but it may alternatively consist of diode rings, MIM-switches, pip's, nin's or other two-terminal devices while $C_{NL}$ may also be a connection of the picture electrode 6 via, for example, a plurality of diodes to different row electrodes as described, for example, in Netherlands Patent Application No. 8502663.

When driving such a device a drive method is usually chosen in which $$V_C = \frac{V_{sat} + V_{th}}{2}$$

is chosen for the mean voltage across a picture element (see FIG. 2). In this method the absolute value of the voltage across the picture elements 12 is substantially limited to the range between $V_{th}$ and $V_{sat}$. This is further described in "A LCTV Display Controlled by a-Si Diode Rings" by S. Togashi et al, SID '84, Digest pages 324–5.

With this drive around $V_C$, the point 13 should acquire upon selection a mean voltage $V_C = -\frac{1}{2}(V_{sat}+V_{th})$ during the odd field period and $V_C = \frac{1}{2}(V_{sat}+V_{th})$ during the even field period.

A good effect as far as gradations (grey scales) are concerned is achieved when, dependent on the information at the column electrode 11, the capacitor constituted by the picture electrode element 12 is discharged or charged during the drive via the row electrodes 8 to voltage values between a maximum voltage $V_C+V_{dmax}=V_{sat}$ and a minimum voltage $V_C-V_{dmax}=V_{th}$. Elimination of $V_C$ yields $|V_{dmax}|=\frac{1}{2}(V_{sat}-V_{th})$.

In the ideal case it therefore holds for the data voltage $V_d$ at the column electrode 11 that $$-\tfrac{1}{2}(V_{sat}-V_{th}) \leqq V_d \leqq \tfrac{1}{2}(V_{sat}-V_{th})$$

Since in practice this minimum or this maximum voltage can be increased or decreased, respectively, by crosstalk, a correction must be made for the voltages $V_d$ used in practice so that it holds for the corrected voltages $V_x$ that $-V_x \leqq V_d \leqq V_x$, in which $|V_x| > |V_{dmax}|$.

The crosstalk for which there must be a compensation will now be calculated with reference to FIGS. 3, 4. If a signal variation $V_x$ occurs at a column electrode 11 in, for example a device for picture display, this results at the point 13 (FIG. 4) associated with a non-selected display element in a signal variation $$V = V\frac{C_{NL}}{xC_{LC}+C_{NL}} \quad (1)$$

The maximum signal variation at the column electrode 11 is at most $V_x$ in the method according to the invention because the data is present only during a part of the maximum period which is available for selection and because subsequently the reference voltage (0 volt) is presented to the column electrode. The data voltage may of course also be 0 Volt first and subsequently the actual data voltage $V_d$ may be presented during a part of the period available for selection.

Also when crosstalk compensation is used in accordance with the method described in Netherlands Patent Application No. 8601804 the maximum signal variation at a column electrode is at most $V_x$ in a method according to the invention because (at a maximum signal $V_x$) the data voltage first changes from $V_x$ to $-V_x$ (change$=2V_x$) and then changes to 0 Volt within the selection period.

At the point 13 where signal $V_x$ has just been written. such a voltage step of the value $V_x$ on the line 11 may give rise to a voltage $$V_x - \Delta V = V_x - V_x\frac{C_{NL}}{C_{NL}+C_{LC}} =$$

$$V_x\left(1 - \frac{1}{k+1} = V_x\left(\frac{k}{k+1}\right)\text{with}\right.$$

$$k = \frac{C_{LC}}{C_{NL}}.$$

For a satisfactory drive of the liquid crystal element, $V_x-\Delta V$ must be just equal to $V_{dmax}$ or $$V_x\left(\frac{k}{k+1}\right) = \frac{1}{2}(V_{sat}-V_{th}) \quad (2)$$

$$V_x = \frac{1}{2}\left(\frac{k+1}{k}\right)(V_{sat}-V_{th}) \quad (3)$$

For the crosstalk term $\Delta V_o$ this means:

$$\Delta V_o = V_x\left(\frac{1}{1+k}\right) \quad (3)$$

$$\frac{1}{2k}(V_{sat}-V_{th}) \quad (4)$$

If the data signal $V_x$ is presented during a maximum period $T_s$ which is available for selection (64 μsec in the PAL-SECAM system) the effective voltage $V_{peff}$ at the point 13 associated with another picture element may be $V_{peff}=V_p+\Delta V_{oeff}$ due to crosstalk.

To prevent this crosstalk from affecting the picture display having a maximum of $N_o$ gray scales (or colour gradations) it must hold that $$\Delta V_{oeff} \leqq \frac{V_{sat}-V_{th}}{N_o}\text{, or}$$

in other words, the maximum number of grey levels $$N_o = 2k = \frac{2C_{LC}}{C_{NL}}.$$

In a typical liquid crystal picture element (dimensions 300×300 μm, thickness approximately 8 μm, $\epsilon_r \approx 6$) and an a-Si non-switch (dimensions approximately 20×20 μm, thickness i-layer approximately 400 nanometer) it holds that $C_{LC} \approx 600$ fF and $C_{NL} \approx 120$ fF so that $N_o \leqq 10$. In the embodiment of the Patent Application No. 8502663, approximately twice the value holds for $C_{NL}$ because a diode is arranged on either side of the picture electrode. For this it holds that $N_o \leqq 5$ which it too low for a satisfactory display.

Figure 5:
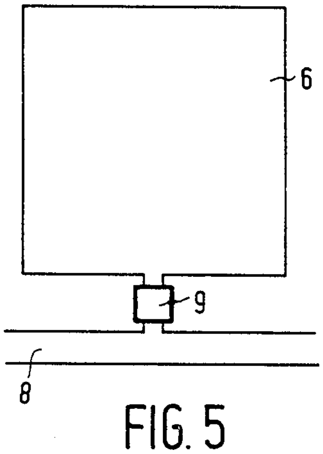
FIG. 5 is a diagrammatic plan view of a display cell.
Figure 6:
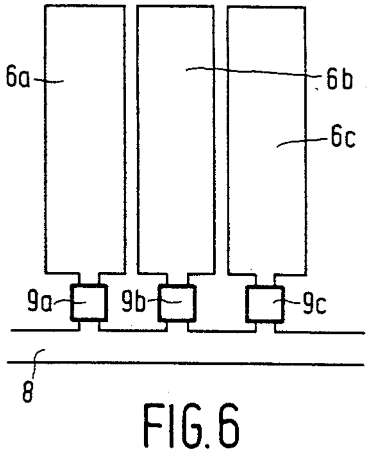
FIG. 6 shows a modification of the display cell of FIG. 5, FIGS. 7 and 8 diagrammatically show signals as they occur in the circuit of FIG. 3 according to the method of the invention, and FIG. 9 diagrammatically shows a circuit for realizing such signals.

If as stated above it is desirable to use redundancy, one picture element can be split up into r sub-elements, each with their own driving element. This is diagrammatically shown in FIGS. 5 and 6 in which the picture electrode 6 with drive-switching element 9 (FIG. 5) is split up into three sub-electrodes $6^a$, $6^b$, $6^c$ each with its own driving element $9^a$, $9^b$, $9^c$ (FIG. 6). The picture electrode 7 corresponding to the picture electrode 6 is not split up.

When splitting up the picture electrode into sub-electrodes, the capacitance $C_{LC}$ also decreases. It can be roughly assumed that the number of grey levels initially decreases from N to $N' = N/r$ due to crosstalk when splitting up the picture element into r sub-elements. In the examples approximately 3 and approximately 1.5 levels thus remain available if the shown split-up into 3 sub-electrodes is used. The use of redundancy is therefore useless in this case.

When using a method according to the invention the data is, however, presented during an $m^{th}$ part of the maximum available selection period $T_s$ so that it now holds for the effective voltage that:

$$V_{peff}^2 = \frac{(V_p + \Delta V_o)^2 \frac{Ts}{m} + V_p^2\left(Ts - \frac{Ts}{m}\right)}{TS}$$

or $$V_{peff}^2 = V_p^2 + \frac{\Delta V_o^2}{m} + \frac{2\Delta V_o V_p}{m} = V_p^2\left[1 + \frac{2\Delta V_o}{mV_p} + \frac{\Delta V_o^2}{mV_p^2}\right]$$

with $mV_p >> \Delta V_o$ it holds that $$V_{peff}^2 \approx V_p^2\left[1 + \frac{2\Delta V_o}{mV_p}\right] \text{and}$$

$$V_{peff} = V_p + \Delta V_{1eff} \approx V_p + \frac{\Delta V_o}{m} \qquad (5)$$

For the crosstalk signal $\Delta V_1$ it holds that $$\Delta V_{1eff} = \frac{\Delta V_o}{m} \overset{(4)}{=} \frac{1}{2mk}(V_{sat} - V_{th}) \qquad (6)$$

$N_1$ grey scale can be realized therewith, provided that $$\Delta V_{1eff} \leqq \frac{(V_{sat} - V_{th})}{N_1}$$

so that for the maximum number of grey scales $N_1$ it now holds that $N_1 = 2mk = mN_o$. By presenting the data voltage during an $m^{th}$ part of the available line selection period the number of grey scales thus increase by approximately a factor m.

A still further increase is obtained if after having presented the data signal during Ts/m to the column electrode 11 of a selected cell the inverse data signal is presented to the same column electrode 11 while the cell is no longer selected. For the effective voltage $V_{peff}$ it then holds that $$V_{peff}^2 = \frac{(V_p + \Delta V_o)^2 \frac{Ts}{m} + (V_p - \Delta V_o)^2 \frac{Ts}{m} + V_p^2\left(Ts - \frac{2Ts}{m}\right)}{Ts}$$

which may be rewritten as $$V_{peff}^2 = V_p^2\left[1 + \frac{2\Delta V_o^2}{mV_p^2}\right], \text{ so that, with } mV_p^2 >> 2\Delta V_o^2\text{:}$$

$$V_{peff} \approx V_p\left[1 + \frac{\Delta V_o^2}{mV_p^2}\right] = V_p + \frac{1}{m}\,\frac{\Delta V_o^2}{V_p}.$$

The latter can be rewritten as $$V_{peff} = V_p + \frac{1}{m}\,\frac{(\Delta V_o)^2}{(V_{sat} - V_{th})^2}\,\frac{(V_{sat} - V_{th})^2}{V_p} \overset{(4)}{=} V_p + \Delta V_{2eff}$$

-continued $$\text{or } \Delta V_{2eff} \overset{(4)}{=} \frac{1}{m}\left(\frac{1}{2k}\right)^2 \frac{(V_{sat} - V_{th})}{V_p}(V_{sat} - V_{th}) \qquad (7)$$

With $V_{th} \leqq V_p \leqq V_{sat}$ it holds that $$\Delta V_{2eff} \leqq \frac{1}{m}\,\frac{1}{4k^2}\,\frac{(V_{sat} - V_{th})}{V_{th}}(V_{sat} - V_{th})$$

so that for this drive mode (with crosstalk compensation) it holds for the maximum number of grey scales $N_2$ that $$N_2 = m \cdot (4k)^2 \frac{V_{th}}{V_{sat} - V_{th}} = m \cdot N_o^2 \frac{V_{th}}{V_{sat} - V_{th}} \qquad (8)$$

For a liquid crystal (ZL1 84460, Merck) it typically holds that $V_{th} = 2.1$ Volt, $V_{sat} = 3.6$ Volt so that for $N_2$ it holds that $$N_2 = 1.4\ m4k^2$$

or $$N_2 = 1.4mN_o^2.$$

It can be concluded that for the number of grey scales associated with conventional drive ($N_o$) and drive according to the invention without ($N_1$) and with crosstalk compensation by signal inversion ($N_2$) in this specific example it holds that $$N_o = 2k \qquad k = \frac{C_{LC}}{C_{NL'}}$$

$$N_1 = mN_o$$

$$N_2 = 1.4\ mN_o^2$$

For $k = 2.5$ and 5 it now holds that $N_o = 5$ and 10, respectively; with $m = 2$ $N_1 = 10$ and 20, respectively $\left(\frac{Ts}{m} = 32\ \mu\text{sec}\right)$ (*PAL*)

$N_2 = 70$ and 280, respectively with $m = 8$ $\quad N_1 = 40$ and 80, respectively $\left(\frac{Ts}{m} = 8\ \mu\text{sec}\right)$ With redundance in this last-mentioned example, when splitting up into 3 sub-electrodes ($r = 3$), it holds:

$N_1' \approx 3$ and $\approx 27$, respectively $N_2' \approx 93$ and $\approx 373$, respectively The method according to the invention is therefore eminently suitable for realizing grey scales in liquid crystal display devices.

Since the period Ts/m is smaller than the maximum period Ts available for selection, the switching element 9 is conducting during a part of the line period (which is, for example 64 μsec in television uses). It is true that the picture element is then not completely charged, but due to the steep characteristic of such elements this is negligible. In addition this loss of voltage is substantially identical for all switching elements so that, if desired, this can be compensated for in the selection voltages. The selection voltages themselves can also be compensated for the described forms of crosstalk.

Figure 7:
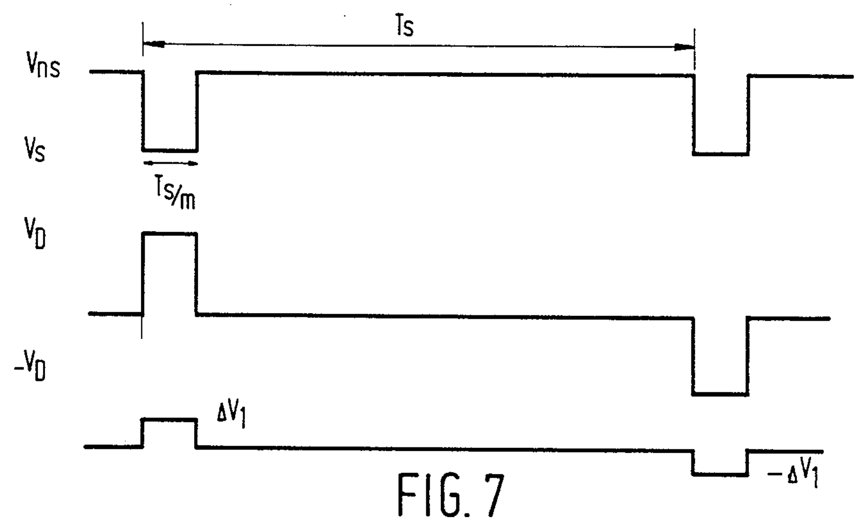
Figure 8:
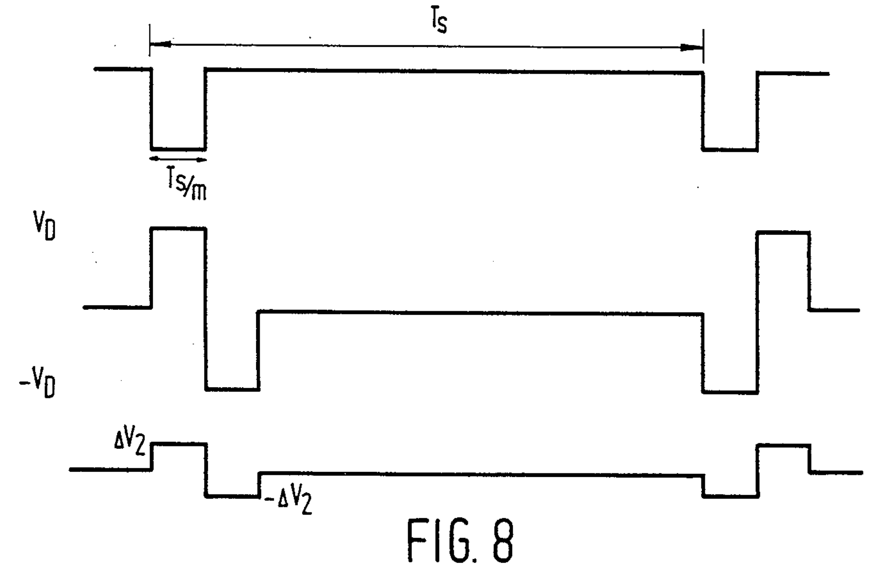

FIGS. 7 and 8 show respectively the data $V_D$ and the associated crosstalk signals $\Delta V_1$, $\Delta V_2$ for a device according to the invention without and with the described crosstalk compensation.

Figure 9:
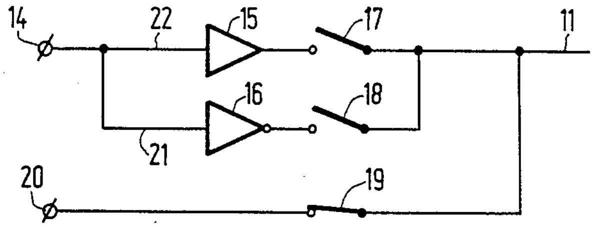

The compensation signal $-V_D$ can be obtained in a simple manner from the signal $V_D$ which is presented, for example to a common input terminal 14 (see FIG. 9) for a follower circuit 15 and an inverter 16 whose outputs are connected via switches 17, 18 to a column electrode 11. By closing switch 17 and subsequently switch 18 for a corresponding period the desired signal is obtained at the column electrode. The column electrode N subsequently receives the reference signal because switch 19 is closed while the switches 17, 18 remain open. The electrode 11 is now connected via switch 19 to the terminal 20 for the reference voltage. This situation is shown in FIG. 9. If no crosstalk compensation is used, the sub-branch 21 with the inverter 16 and switch 18 can be dispensed with. In that case the follower circuit 15 can also be dispensed with, if desired. The switch 19 is then complementary to switch 17, in other words when switch 19 is closed, switch 17 is open and vice versa. When using crosstalk compensation, the switch 19 operates complementarily with the circuit formed by the two sub-branches 21, 22.

The invention is of course not limited to the embodiments shown, but several variations are possible within the scope of the invention.

For example, diode rings, back-to-back diodes, MIM switches, nin-, pip-, pinip-switches can be chosen for the non-linear switching elements, provided that the switching rate is high enough.

Several variations are also possible in the realization of the drive circuit of FIG. 9.

In addition different electro-optical media can be chosen, such as, for example electrophoretic suspensions or electrochromic materials.

The embodiment is based on a switching mode in which the data voltages across the picture elements switch around zero volt and the voltage sweep 2 $V_{dmax}$ across the picture elements remains limited to $V_{sat}-V_{th}$. The method according to the invention is also advantages for other choices of the data voltage and the reference level. Possible deviations of T-V curve from the exponential behaviour can be compensated for in a simple manner in practice by suitable choice of the data voltages which are allotted to given grey values.

What is claimed is:

1. A method of driving a display device, said display device including an electro-optical display medium between two supporting plates, a matrix of picture elements arranged in rows and columns, each of said picture elements being formed by picture electrodes provided on opposing facing surfaces of said two supporting plates, and a system of row and column electrodes adjacent to said picture electrodes of said facing surfaces, said method comprising the steps of (a) presenting a selection signal to one of said rows of picture elements through one of said row electrodes by using non-linear switching elements arranged in series between said row electrodes and said picture electrodes at one side of said facing surfaces, said selection signal being presented during a time period for selecting said one of said rows of picture elements, (b) presenting at least a part of a data signal to one of said column electrodes at an opposite facing surface during a portion of said time period, said data signal being presented substantially simultaneously with said selection signal presented to said one of said row electrodes, (c) presenting a non-selection signal to said one of said row electrodes during the remaining portion of said time period, and (d) presenting a reference voltage to said column electrodes in the absence of said data signal.

2. A method according to claim 1, wherein said display device is a television display device, and wherein said reference voltage is determined by the mean value of a minimum data signal voltage in a first time frame and a maximum data signal voltage in a second time frame.

3. A method according to claim 1, wherein for carrying out said step (d), sub-signals are provided by changing the sign of said data signal with respect to said reference voltage, said sub-signals having an energy content with a positive sign substantially identical to an energy content with a negative sign, and wherein one of said sub-signals substantially coincides with said selection signal.

4. A method according to claim 1 or claim 2 or claim 3, wherein said reference voltage is substantially 0 volt.

5. A method according to claim 4, wherein said data signal consists of two sub-signals of substantially equal duration and having substantially identical absolute voltage values.

6. A method according to claim 5, wherein said data signal has a duration of between 8 and 32 μsec.

7. A method according to claim 2, wherein said data signal has a duration of between 8 and 32 μsec.

8. A method according to claim 3, wherein said data signal consists of two sub-signals of substantially equal duration and having substantially identical absolute voltage values.

9. A method according to claim 8, wherein said data signal has a duration of between 8 and 32 μsec.

10. A method according to claim 3, wherein said data signal has a duration of between 8 and 32 μsec.

11. A method according to claim 1, wherein said data signal has a duration of between 8 and 32 μsec.

12. A display device comprising (a) two spaced supporting plates with at least one of said two plates being transparent, (b) an electro-optical medium disposed between said two plates, (c) a plurality of picture electrodes disposed on each facing surface of said two plates, said plurality of picture electrodes defining an array of picture elements, said array being disposed in rows and columns, (d) an array of row and column electrodes for driving said picture elements, said row and column electrodes being disposed at least adjacent to said picture elements, wherein said row electrodes are disposed on a facing surface of one of said two plates and said column electrodes are disposed on a facing surface of another of said two plates, (e) an array of non-linear switching elements being disposed in series between said row electrodes and said picture electrodes at said facing surface of said one of said two plates, and (f) means for respectively connecting at least one of said column electrodes to a first terminal for receiving a signal to be displayed, and to a second terminal for receiving a reference voltage, said means including a parallel arrangement of two branches having complementary operating switches.

13. A display device according to claim 12, wherein one of said two branches is connected to said first terminal, and said one of said two branches includes a parallel arrangement of two sub-branches having sub-switches, and wherein one of said two sub-branches is disposed with one of said sub-switches and an inverter circuit in series.

14. A display device according to claim 12 or claim 13, wherein drive circuit means are included for driving said switches to present said column electrode either with a reference voltage or with said signal to be displayed or with a signal derived therefrom or with a signal inverse to said signal to be displayed.

15. A display device according to claim 14, wherein sub-signals are provided by said means to said at least one of said column electrodes, said sub-signals being substantially equal in absolute value, and said sub-signals each being presented to said at least one of said column electrodes during substantially the same period.

16. A display device according to claim 14, wherein said electro-optical medium is a liquid crystal medium, an electrophoretic suspension, or an electrochromic material.

17. A display device comprising (a) two spaced supporting plates with at least one of said two plates being transparent, (b) an electro-optical medium disposed between said two plates, (c) a plurality of picture electrodes disposed on each facing surface of said two plates, said plurality of picture electrodes defining an array of picture elements, said array being disposed in rows and columns, (d) an array of row and column electrodes for driving said picture elements, said row and column electrodes being disposed at least adjacent to said picture elements, wherein said row electrodes are disposed on a facing surface of one of said two plates and said column electrodes are disposed on a facing surface of another of said two plates, (e) an array of non-linear switching elements being disposed in series between said row electrodes and said picture electrodes at said facing surface of said one of said two plates, and (f) a plurality of sub-electrodes for each of said picture electrodes, each of said plurality of sub-electrodes being driven by at least one of said non-linear switching elements.

18. A display device according to claim 17, wherein said electro-optical medium is a liquid crystal medium, an electrophoretic suspension, or an electrochromic material.

* * * * *